United States Patent [19]
Butigieg

[11] Patent Number: 5,924,742
[45] Date of Patent: Jul. 20, 1999

[54] APPARATUS FOR JOINING STOP COCK TO A VALVE BODY

[75] Inventor: Guy-Laurent M. Butigieg, Saint Etienne, France

[73] Assignee: BTR Valves S.A., France

[21] Appl. No.: 08/827,308

[22] Filed: Mar. 28, 1997

[51] Int. Cl.$^6$ .................................................. F16L 13/00
[52] U.S. Cl. ..................... 285/12; 285/114; 285/285.1; 285/289.1; 285/331; 285/915
[58] Field of Search ............................. 285/285.1, 289.1, 285/331, 12, DIG. 915, 21.3, 288.1, 114; 137/505.11, 505.22; 403/361

[56] References Cited

U.S. PATENT DOCUMENTS

| | | | |
|---|---|---|---|
| 2,788,192 | 4/1957 | Mountford | 137/505.22 |
| 3,707,972 | 1/1973 | Villari et al. | 285/12 |
| 5,085,472 | 2/1992 | Guest | 285/331 X |
| 5,251,714 | 10/1993 | Murofushi | 285/289.1 X |
| 5,336,351 | 8/1994 | Meyers | 285/21.3 X |
| 5,536,050 | 7/1996 | McDermott et al. | 285/288.1 |

*Primary Examiner*—Anthony Knight
*Assistant Examiner*—Gary Grafel
*Attorney, Agent, or Firm*—Wall Marjama Bilinski & Burr

[57] ABSTRACT

A valve having a purging apparatus includes a valve body having a defined passage that is aligned along an axis of the valve body. A conduit having an axis passing downwardly through the valve body and in communication with the passage forms an angle with the axis of the valve body. A slit is formed in the valve body about the axis of the conduit to establish a housing integral with the valve body. The slit surrounds and isolates the housing and a portion of the conduit from the valve body to a given depth and includes a depth and a width such that the housing is isolated from stresses induced in the valve body. A tubular element is joined to the housing in axial alignment with the conduit and is inserted to a depth that is less than the given depth of the slit. The valve is purged through the tubular element via the conduit.

8 Claims, 3 Drawing Sheets

APPARATUS FOR JOINING STOP COCK TO A VALVE BODY

BACKGROUND OF THE INVENTION

The invention is related to the technical sector of connection equipment for plumbing and the distribution of fluids (water, gas, and other like fluids) and more particularly to valves which are intended to permit the flow or stoppage of fluid in circulation.

The use of valves which are fabricated of thermoplastic materials is known.

These valves are represented for example and not by way of limitation, in FIG. 1. They include a body (1) having on an axial level, opposing nozzles (2) permitting the adaptation and joining of pipes. Inside, the body is equipped with a closure element of the valve type (3) or gate valve controlled in its position by a maneuvering means (4) of the faucet or other type. The entirety of the valve body may or may not be fabricated as an integral unit, or welded with end fittings.

This type of product is widely used, offering all assurances of reliability and safety.

This type of product is intended to be buried and normally its use is anticipated for a very long service life of between thirty and fifty years.

This type of material may necessitate the use of a flushing element in the form of a tube (5) likewise of thermoplastic material connected and attached perpendicularly to the body of the valve, said tube being also connected to an opening or conduit (1b) disposed in the walls of the body and emptying inside the latter to permit purging the air.

The problem posed resides in the fact that the tubular element (5) constituting the purging means is attached directly by soldering or welding (7) onto the valve body. It turns out in practice that during qualification tests (aging, bending, etc.) conducted on the valves and in accordance with established standards, it occurs relatively frequently that the soldering comes loose as a result of the propagation of mechanical stress appearing in the material of the valve body. This situation is particularly annoying for it entails the total loss of the valve, which deteriorates and becomes unusable.

SUMMARY OF THE INVENTION

The applicant, in encountering this problem, has reflected on the search for a solution making it possible to eliminate said disadvantage.

The difficulty resides in the fact that according to current practice the tubular elements of the purge type are attached perpendicularly to the valve body.

The use is known, moreover, in making assemblies of connecting elements of thermoplastic material, of various soldering techniques by heating which are carried out when the elements to be assembled are arranged coaxially. For example, the soldering called "end-to-end" is practiced, either by insertion or by the use of an intermediate electrically weldable coupling sleeve.

Consequently, Applicant would like to combine the benefits of a first arrangement wherein the axis of the tubular element is perpendicular to the axis of the valve body with the benefits of a second arrangement wherein the tubular element and the valve body are welded together in an axial arrangement. After careful research and development, Applicant has invented an arrangement wherein the tubular element and the valve body perform well by remaining tightly fitted under various mechanical tests of present industry standards.

The solution provided is simple to put into operation and makes it possible to liberate the connection zone of the tubular element attached to the valve body from various constraints and requirements of the valve during qualification tests.

According to the invention and a first characteristic, the coupling device between the tubular element emplaced in an angular plane relative to the body of the valve is remarkable in that there is disposed in the receiving wall of the valve body a housing with a circular throat produced in a portion of the wall of the attachment zone of the valve body by defining a slit of an appropriate depth and making a release of the connection of the tubular element with the rest of the body of the valve, said circular valve being concentric to the external housing, defining a circular collar (1c) forming a sleeve, the connection being achieved by any form of welding, soldering, gluing, or other means, and in the same axial plane as the tubular element with the collar.

According to another characteristic of the invention, the procedure for putting it into practice is obtained by making in the wall of the valve body a housing, preferably circular, which may permit the positioning of the end having a profile identical to that of the tubular element, this housing being in communication with a conduit emptying into the interior of the valve body, and in that one proceeds, with the aid of a tool, to form a circular throat disposed concentrically and exterior to the housing of the tubular element by defining a rupture zone of the material in the body, and a circular collar forming a sleeve surrounding the tubular element after attachment, for making a connection in an axial plane.

According to another characteristic, the circular collar is mounted on a wide wall to permit attachment of the tubular element by soldering.

BRIEF DESCRIPTION OF THE DRAWINGS

These characteristics and others will be evident as a result of the description.

To demonstrate the object of the invention in a non-limiting way, Figures are provided, of which.

DESCRIPTION OF THE INVENTION

In order to render the object of the invention more concrete, it will now be described in a non-limiting way [with reference] to the figures of the drawings.

Figure 1:
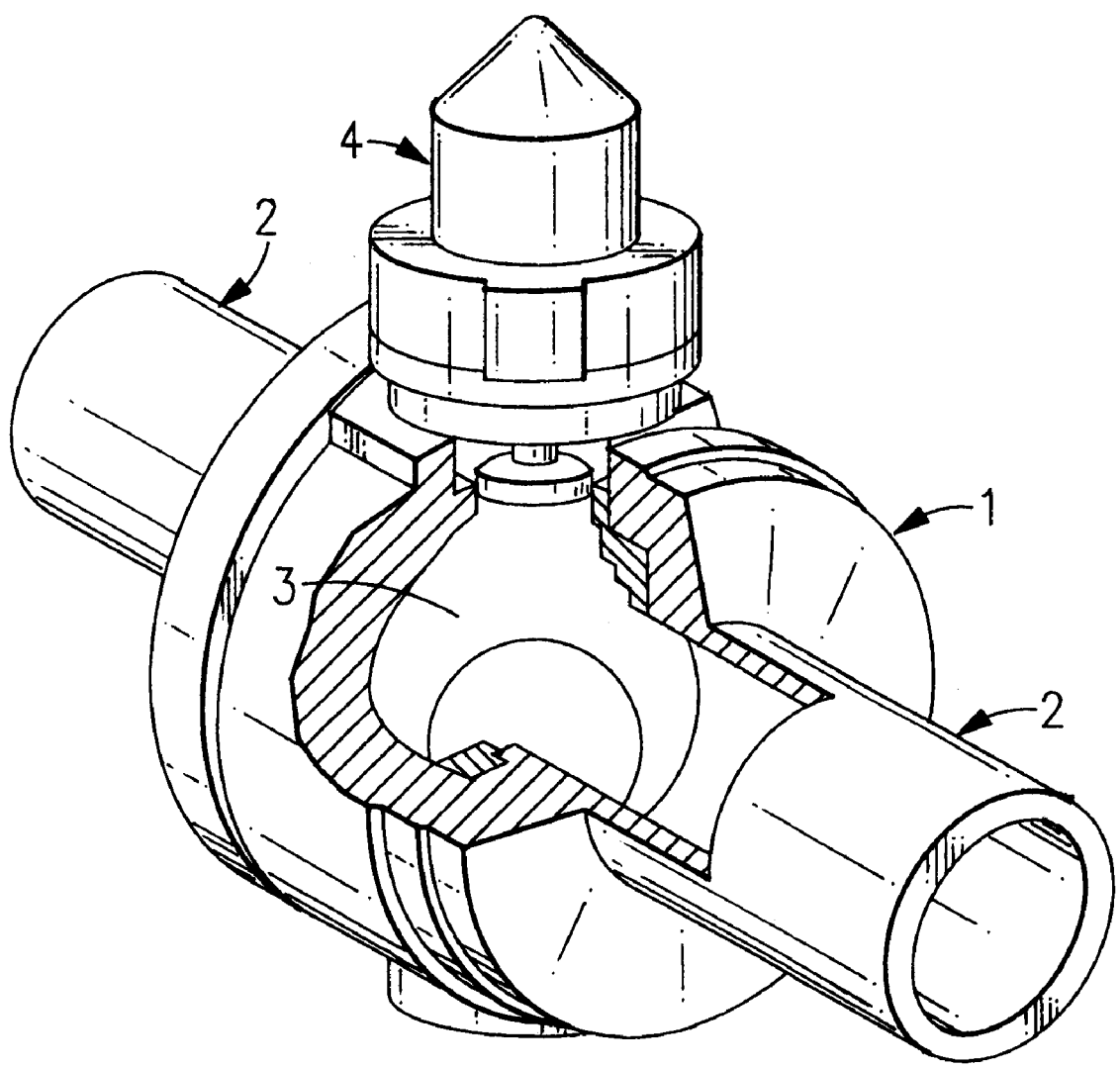
FIG. 1 is a view according to the type of valve according to prior art.
Figure 2:
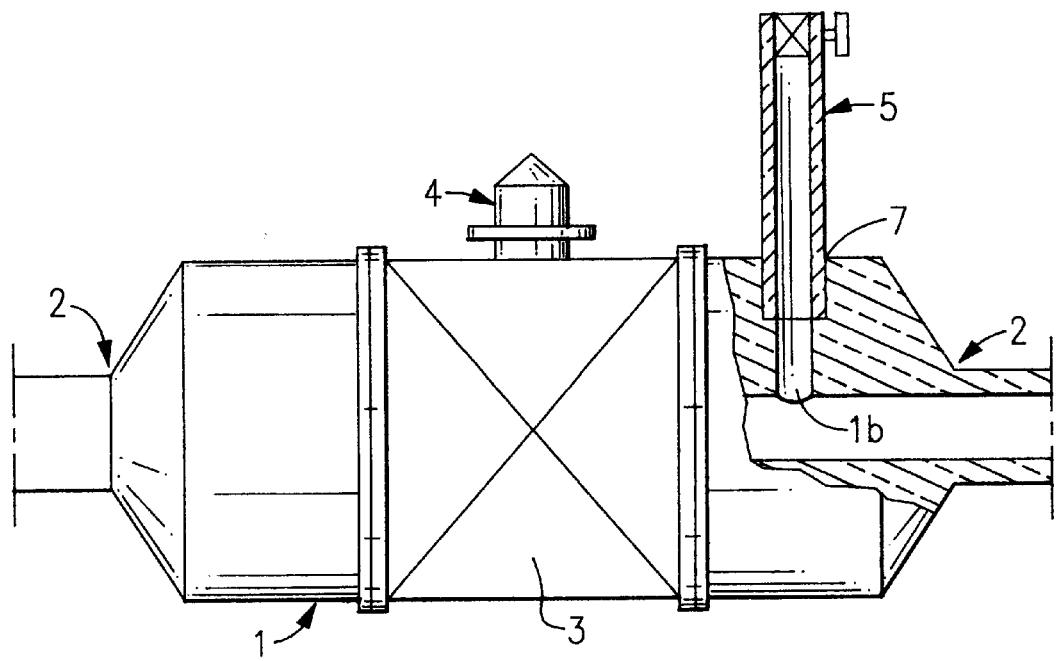
FIG. 2 is an enlarged partial view illustrating the connection by soldering and according to the prior-art type of a tubular element of the purger type on the valve of FIG. 1.

The elements constituting the valve previously recalled and illustrated in FIG. 1 are retained without modification of their reference numbers.

Figure 3:
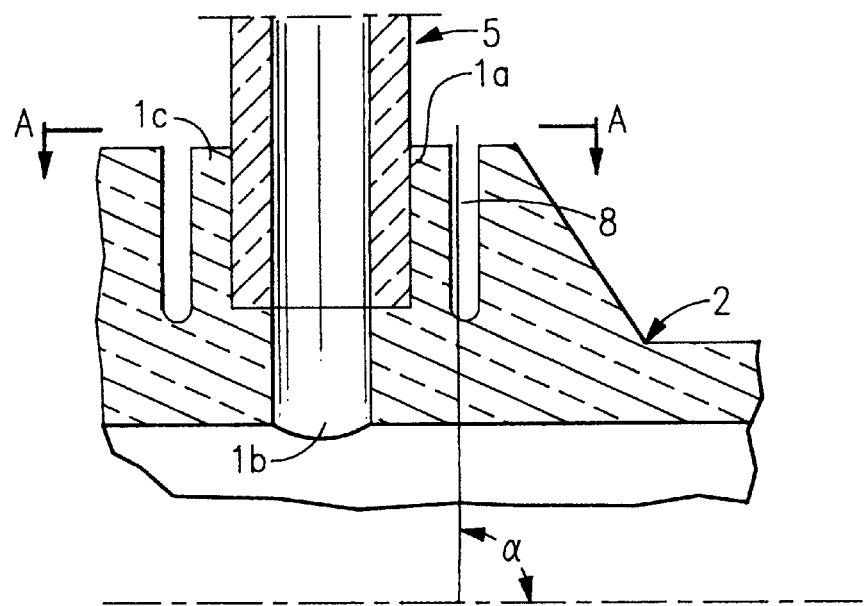
FIG. 3 is a magnified partial view with a cutaway illustrating the connection device according to the invention.
Figure 4:
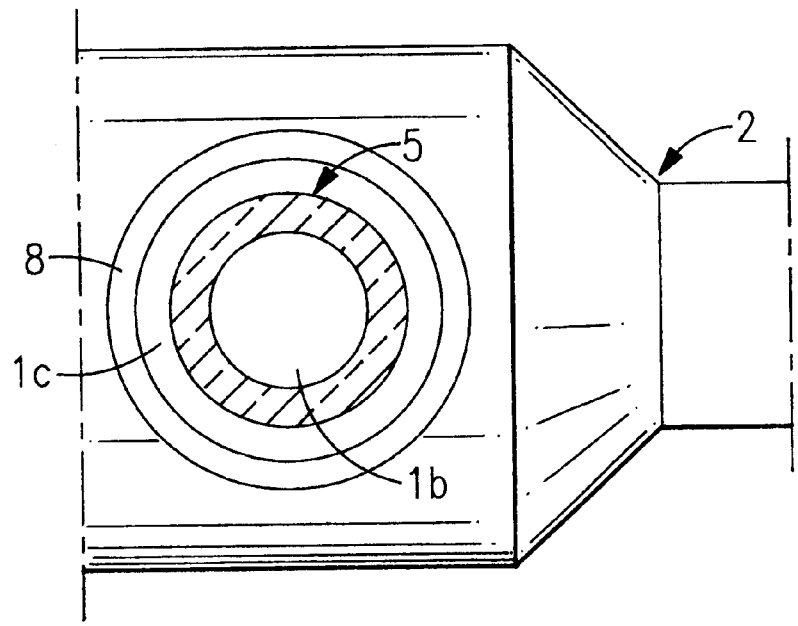
FIG. 4 is a top view along line A—A of FIG. 3.

According to the invention, the tubular element (5) of the purger or drain cock is connected and positioned relative to a housing (1a) formed in the body of the valve, this housing being profiled and especially circular to ensure the maintenance of the end of said profiled element in a supplementary way. This housing (1a) is extended by a conduit (1b) disposed in the wall of the body to empty into the interior of the valve body in order to ensure the operation sought. Around this housing there is formed at a given angle α a circular throat (8) disposed perpendicularly or obliquely and at an appropriate depth, thus defining a separation zone of the material around said housing. This circular throat is concentric to the housing and exterior to the housing, defining a collar (1c) which is tubular, of appropriate thickness to permit the connection and attachment with the exterior tubular element (5) of the drain cock type. The circular throat isolates the connection joint between the tubular element (5) and the valve body from all of the mechanical stresses produced during aging tests, since the circular throat has a depth greater than that of the tubular element with respect to the valve body (FIG. 3). Therefore, this connection joint, usually formed by soldering, gluing, or other method, remains intact after the aging tests are performed on the valve.

Figure 5:
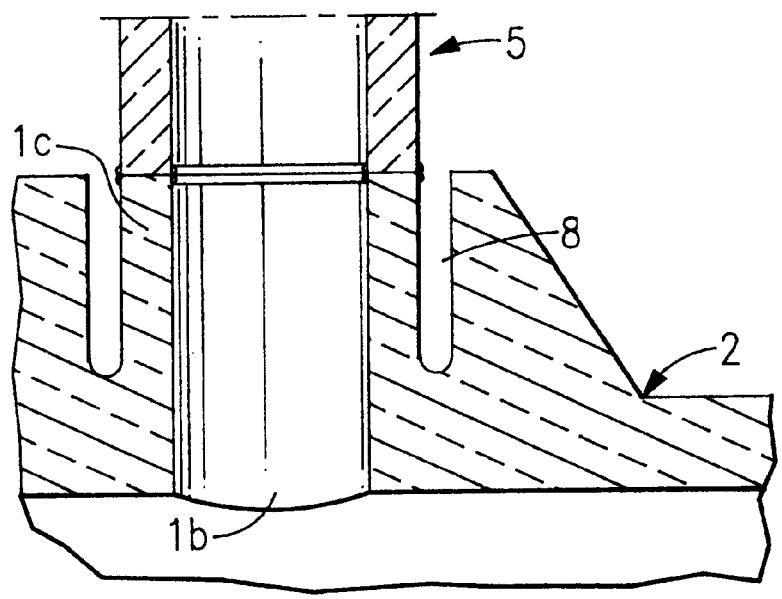
FIG. 5 is a view of a variant of the connection means according to FIG. 3 of an end-to-end positioning.

In the case of a connection by end to end soldering or welding represented [in] FIG. 5, the tubular element comes end-to-end on the pre-formed collar edge.

In the case of a connection achieved by insertion soldering (FIG. 3), which is known, the inside walls of the collar and the exterior of the tubular element (5) are heated, such that a firm connection is formed by polymerization after the tubular element is inserted into the collar.

The described solution thus makes it possible to obtain a connection of the tubular element (5) with the body of the valve by an axial insertion due to the arrangement and the shape of the collar which serves as a receiving sleeve by ensuring an axial positioning of the element (5) with the collar. Since the collar, which is partially defined by the circular throat serves as a receiving sleeve for the tubular element, various angular orientations between the tubular element and the valve body can be achieved when forming the collar and the circular throat. The collar is produced on a wide wall to take into account the cross section of the tubular element.

The tool necessary for the implementation of the circular throat is known per se. It may be a cutting tool, a bell tool, or some other type.

The procedure according to the invention therefore comprises forming in the wall of the valve body a housing, preferably circular, which may permit the positioning of the end of the tubular element of the drain cock, likewise of thermoplastic material.

This housing is in communication with the conduit emptying into the interior of the valve body. Subsequently, a circular throat is formed oriented angularly, perpendicularly or obliquely relative to the longitudinal axis of the valve, defining a collar forming a sleeve arranged axially in the plane of positioning of the tubular element forming the drain cock. The connection is subsequently attained by soldering, gluing, or otherwise of the tubular element forming the drain cock in its housing.

The main advantage of the present invention is that the circular throat isolates mechanical stresses which are induced in the valve body from the connection joint formed between the tubular element and the valve body, thereby preserving the useful life of the valve. As should be evident, the circular throat, collar and tubular element can be arranged at a variety of angles with respect to the axis of the valve body in order to provide optimum protection of the connection joint for certain known or unknown mechanical stresses.

I claim:

1. In a valve, apparatus for purging said valve that includes:

a valve body having a passage therein that is aligned along an axis of said valve body and a conduit having an axis passing downwardly through said body that is in communication with said passage, the axis of the conduit forming an angle with the axis of said valve body, a slit formed in said valve body to a given depth about the axis of the conduit to establish a housing integral with said valve body that surrounds and isolates the housing and a portion of said conduit from said valve body, said slit having a depth and a width such that the housing is isolated from some stresses induced in said valve body, and a tubular element joined to said housing in axial alignment with said conduit, wherein said tubular element is inserted into said conduit to a depth less than said given depth, and wherein the valve can be purged through said conduit.

2. The apparatus of claim 1 wherein said slit is circular in form and is brought to a predetermined depth to facilitate release of the tubular element.

3. The apparatus of claim 1 wherein said tubular element is joined by solder in end to end relation with said housing.

4. The apparatus of claim 1 wherein one end of said tubular element is inserted into a receiving opening in said housing.

5. The apparatus of claim 1 wherein the tubular element is joined to said housing by glue.

6. A method of joining a drain cock to a valve body, having a passage formed therein, said method including the following steps of:

forming a slit describing the cross section of a housing in the body of the valve to a predetermined depth, said slit isolating the housing from the body of the valve, forming an axially disposed conduit through said housing that is in communication with the valve passage, inserting a tubular element to a given depth into a receiving opening formed in said conduit, said opening being in axial alignment with said conduit whereby the valve passage can be connected to a drain cock, said slit having a depth and a width such that the tubular element is isolated from some stresses induced in said valve body, said predetermined depth of said slit being greater than said given depth of said tubular element, and forming a joint between the tubular element and the housing.

7. The method of claim 6 wherein the joint is formed by soldering.

8. The method of claim 6 wherein the joint is formed by gluing.

* * * * *